US008608560B1

(12) United States Patent
Perrone et al.

(10) Patent No.: US 8,608,560 B1
(45) Date of Patent: Dec. 17, 2013

(54) NON-DETERMINISTIC ANIMATIONS WITH PREDETERMINED RESULT

(75) Inventors: Rick Perrone, Darien, CT (US); George Stadnick, New York, NY (US); Kal Patel, Stamford, CT (US); Matt Edzenga, Stamford, CT (US)

(73) Assignee: Tournament One, Corp., Stamford, CT (US)

( * ) Notice: Subject to any disclaimer, the term of this patent is extended or adjusted under 35 U.S.C. 154(b) by 0 days.

(21) Appl. No.: 12/270,770

(22) Filed: Nov. 13, 2008

Related U.S. Application Data

(63) Continuation-in-part of application No. 11/531,271, filed on Sep. 12, 2006, now Pat. No. 8,216,043.

(60) Provisional application No. 61/036,676, filed on Mar. 14, 2008, provisional application No. 61/114,052, filed on Nov. 12, 2008.

(51) Int. Cl.
*A63F 13/10* (2006.01)

(52) U.S. Cl.
USPC .......... 463/31

(58) Field of Classification Search
USPC .......... 463/31
See application file for complete search history.

(56) References Cited

U.S. PATENT DOCUMENTS

| | | | | |
|---|---|---|---|---|
| 5,237,648 | A * | 8/1993 | Mills et al. | 715/723 |
| 5,607,356 | A * | 3/1997 | Schwartz | 463/31 |
| 5,634,850 | A * | 6/1997 | Kitahara et al. | 463/33 |
| 6,024,640 | A * | 2/2000 | Walker et al. | 463/17 |
| 6,193,605 | B1 * | 2/2001 | Libby et al. | 463/17 |
| 6,254,481 | B1 * | 7/2001 | Jaffe | 463/20 |
| 6,592,457 | B1 * | 7/2003 | Frohm et al. | 463/16 |
| 6,921,331 | B2 * | 7/2005 | Gatto et al. | 463/6 |
| 7,291,070 | B2 * | 11/2007 | Gatto et al. | 463/42 |
| 7,311,607 | B2 * | 12/2007 | Tedsen et al. | 463/32 |
| 7,400,329 | B2 * | 7/2008 | Edwards | 345/581 |
| 7,797,146 | B2 * | 9/2010 | Harless et al. | 703/12 |
| 2001/0036860 | A1 * | 11/2001 | Yonezawa | 463/30 |
| 2002/0052235 | A1 * | 5/2002 | Hirsch et al. | 463/31 |
| 2002/0090986 | A1 * | 7/2002 | Cote et al. | 463/16 |
| 2003/0045334 | A1 * | 3/2003 | Hosokawa | 463/6 |
| 2003/0054882 | A1 * | 3/2003 | Suzuki | 463/30 |
| 2003/0087683 | A1 * | 5/2003 | Gatto et al. | 463/6 |
| 2003/0171140 | A1 * | 9/2003 | Gatto et al. | 463/6 |
| 2004/0230410 | A1 * | 11/2004 | Harless et al. | 703/6 |
| 2005/0054442 | A1 * | 3/2005 | Anderson et al. | 463/35 |
| 2006/0009286 | A1 * | 1/2006 | Durham et al. | 463/30 |
| 2006/0052152 | A1 * | 3/2006 | Tedsen et al. | 463/16 |
| 2006/0189384 | A1 * | 8/2006 | Crawford et al. | 463/31 |
| 2006/0252533 | A1 * | 11/2006 | Sakaguchi et al. | 463/31 |
| 2007/0021203 | A1 * | 1/2007 | Edwards | 463/30 |
| 2007/0037625 | A1 * | 2/2007 | Edwards | 463/42 |
| 2007/0060345 | A1 * | 3/2007 | Edwards | 463/31 |
| 2007/0060346 | A1 * | 3/2007 | Edwards | 463/31 |
| 2007/0060408 | A1 * | 3/2007 | Schultz et al. | 473/131 |
| 2007/0191986 | A1 * | 8/2007 | Van Breemen | 700/245 |
| 2007/0219024 | A1 * | 9/2007 | Allegre | 473/422 |
| 2008/0085769 | A1 * | 4/2008 | Lutnick et al. | 463/41 |
| 2008/0273038 | A1 * | 11/2008 | Girard | 345/474 |

* cited by examiner

*Primary Examiner* — Melba Bumgarner
*Assistant Examiner* — Seng H Lim
(74) *Attorney, Agent, or Firm* — Muskin & Farmer LLC

(57) ABSTRACT

A method, system, and computer readable storage medium to display sports and other animations using a reduced amount of assets. Pregenerated clips can be stored and combined to create complete animations with predetermined outcomes. The same predetermined outcome can have numerous animations which all result in the same predetermined outcome, all while using a reduced amount of stored assets.

8 Claims, 9 Drawing Sheets

NON-DETERMINISTIC ANIMATIONS WITH PREDETERMINED RESULT

CROSS REFERENCE TO RELATED APPLICATIONS

This application claims priority to provisional application 61/036,676 filed Mar. 14, 2008, which is incorporated by reference herein in its entirety. This application also claims priority to provisional application 61/114,052 filed Nov. 12, 2008, which is incorporated by reference herein in its entirety. This application is also a continuation in part of application Ser. No. 11/531,271 filed Sep. 12, 2006, now U.S. Pat. No. 8,216,043, which is incorporated by reference herein in its entirety.

BACKGROUND OF THE INVENTION

1. Field of the Invention

The present inventive concept relates to a system, method, and computer readable storage directed to playing video clips for wagering games.

2. Description of the Related Art

Wagering games are a huge industry in the United States. Video output has been associated with video games in order to make such games more interactive and entertaining.

What is needed is a method, apparatus, and computer readable storage which can generate non-repetitive video presentations that coincide with a player's gaming experience in order to provide for a more entertaining gambling experience for players.

SUMMARY OF THE INVENTION

It is an aspect of the present general inventive concept to provide an improved system and method to display video to be utilized with wagering games.

The above aspects can be obtained by a method that includes (a) storing intermediate character animation clips of a character in a storage medium that are frame matched at a beginning and an end of each clip; (b) storing final character animation clips of the character in the storage medium; (c) receiving a wager from a player on a gaming machine; (d) determining a final outcome using an electronic random number generator; (e) determining utilized clips from the intermediate character animation clips; (f) displaying animation using the utilized clips played sequentially; (g) displaying a final character animation clip associated with the final outcome after the at least two of the intermediate character animation clips are played; and (h) awarding an award to the player, if earned, based on the final outcome.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
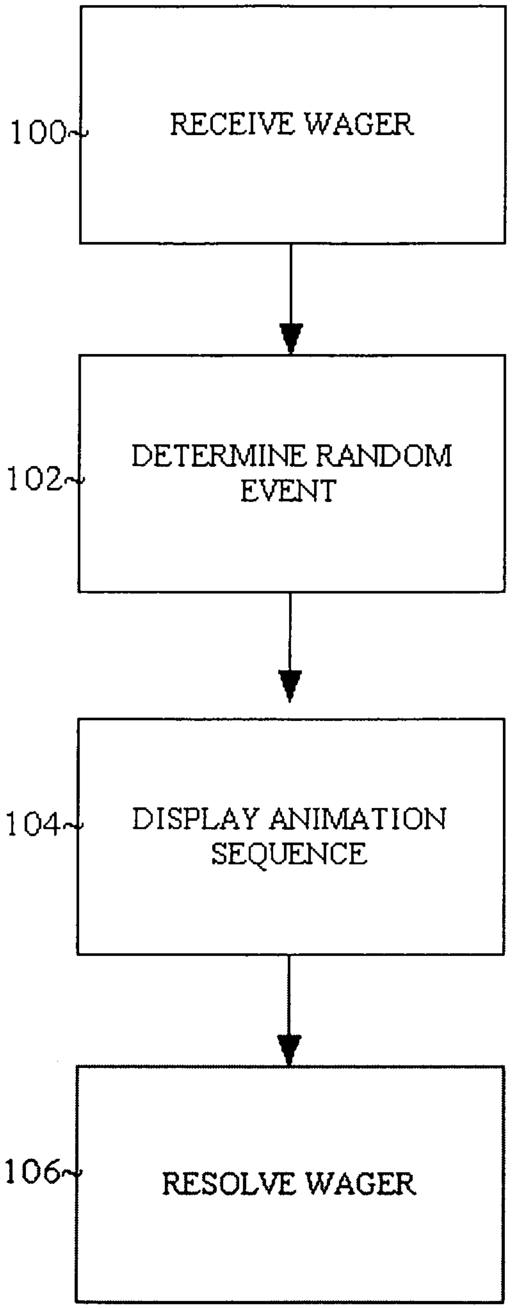
FIG. 1 is a flowchart illustrating an exemplary method of determining and displaying a game outcome, according to an embodiment.

Reference will now be made in detail to the presently preferred embodiments of the invention, examples of which are illustrated in the accompanying drawings, wherein like reference numerals refer to like elements throughout.

The present inventive concept relates to method, apparatus (gaming machine), and computer readable storage medium, that can generate relevant and non-repetitive video output that coincides with a player's game progress. A player can deposit cash (or electronic vouchers) into a gaming machine, receive a respective amount of credits, and wager with those credits. When the player is done wagering, the player can cash out his or her current amount of credits and receive a respective amount of cash or coins (or a voucher directly redeemable for cash or coins).

Wagering games can be tied to sporting events. For example, a virtual soccer game can be displayed in which, whenever a particular team (or player scores), a player wins an award. Such a game can be more exciting for players than simply watching slot symbols line up over and over. In order to make a video presentation more appealing to players, repetitive video presentations should be reduced. If the player views the same animations over and over again, he may grow bored. One way repetitive video presentations can be reduced is to generate or film a multitude of clips, therefore providing the players with a lot of variety. However, this suffers the drawbacks of requiring more storage space for such assets, requiring more initial work to generate such clips, and also subjects the player to the possibility of watching the same video presentation twice.

FIG. 1 is a flowchart illustrating an exemplary method of determining and displaying a game outcome, according to an embodiment.

The method can begin with operation 100, which receives a wager from a player. This can be done as known in the art, for example receiving cash from the player and transforming the cash amount into credits displayed on a credit meter on output device of the gaming machine. The player then indicates he or she wishes to bet a particular amount and the particular amount is deducted from the player's credit meter in order to initiate the wagering game.

From operation 100, the method proceeds to operation 102, which determines a random event. This can be done by using an electronic random number generator. For example, the wagering game can be a golf game and the player's goal is to get the ball as close to the hole as possible. The player watches a character (golfer) on the output device that will swing and hit the ball. The better the shot, the higher the award that the player will win. Table I below illustrates an example set of outcomes, a respective payout, and a respective probability. The numbers in Table I are merely examples and are not intended to have any mathematical relationship.

TABLE I

| Outcome # | description | award | probability |
|---|---|---|---|
| 1 | hole in one | 100:1 | 1/200 |
| 2 | on green, close to hole | 50:1 | 1/100 |
| 3 | on green, far from hole | 25:1 | 1/50 |
| 4 | on fairway, close to hole | 18:1 | 1/45 |
| 5 | on fairway, not close to hole | 15:1 | 1/20 |
| 6 | on fairway, far from hole | 9:1 | 1/10 |
| 7 | in sand trap | 8:1 | 9/100 |
| 8 | in water | 7:1 | 1/8 |
| 9 | out of bounds (left side) | 6:1 | 1/5 |
| 10 | out of bounds (right side) | 2:1 | 3/8 |

From operation 102, the method can proceed to operation 104, which displays an animation sequence. The animation sequence shows the random even determined in operation 102 happen on the output device. In the golf example, if the random outcome was determined to be the hole in one, the output device would display a golfer swinging to hit a ball and the ball flying into the hole. The animation sequence is determined using methods to be described below in more detail.

From operation 104, the method proceeds to operation 106, which resolves the wager placed in operation 100. The player is paid depending on the random event. For example, using table I, if the player bet $1, and received a hole in one (outcome 1) the player would receive $100. If the player receives outcome 8 (in water), the player would receive nothing back. Any winning wager is paid back by increasing the player's credit meter. The contents of the credit meter can be redeemed for cash at a time of the player's choosing.

The animation sequence displayed in operation 104 is displayed using a relatively small amount of graphics assets (e.g., actually animation files such as AVI's, sound files, etc.) Using a smaller number of files is advantageous because it uses less storage space, and also requires less effort to generate the files. The animation sequence is generated by combing ready-made assets (e.g., AVI files) with dynamically generated assets (e.g., backgrounds) in order to generate animation sequences of characters accomplishing events (e.g., hitting a golf ball into the hole, etc.)

Figure 2:
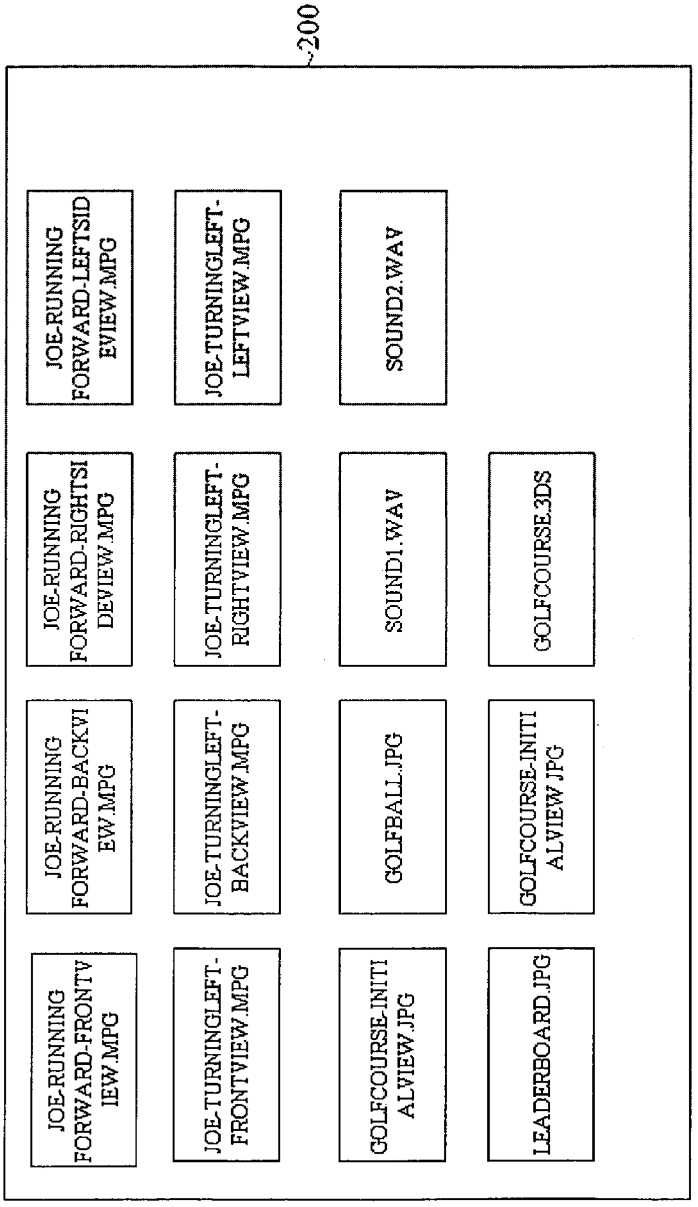
FIG. 2 is a block diagram illustrating a storage of assets in a storage medium, according to an embodiment.

FIG. 2 is a block diagram illustrating a storage of assets in a storage medium, according to an embodiment.

A storage 200 (such as a hard disk drive, ROM, RAM, computer chips, or any other type of electronic storage) can store a plurality of assets in the form of files. These files can contain different clips (in the form of AVI, MPG, etc.) of characters doing different actions. Different views of the character doing the different actions can be stored as well (e.g., a running forward clip can have a front view and a separate clip would be the same action but from a rear view). Sounds (e.g., in the form of WAV or MP3 files) can be stored as well, as well as still views (in the form of JPGs). Three dimensional structured files can also be stored as well (such as a 3DS file) which can store 3-dimensional objects and playing fields such as a golf course, stadiums, etc. The 3-dimensional object can be used to generate moving stadiums and other moving parts which can be superimposed on the clip with the moving character.

Assets can be placed in at least three categories. Static assets, variable assets, and transition assets. Static assets remain static through a whole scene. Variable assets are objects that change and can include scene changes, background, and moving characters. Transitional assets are assets that can go from one scene (clip) to the next, for example a flying golf ball. Using these three types of assets, a multitude of video sequences can be generated. Typically, the three categories of assets are controlled independently. Algorithms used to generate variable scenes can be stored programmed local to the gaming machine being used or can be retrieved from a remote server.

Figure 3:
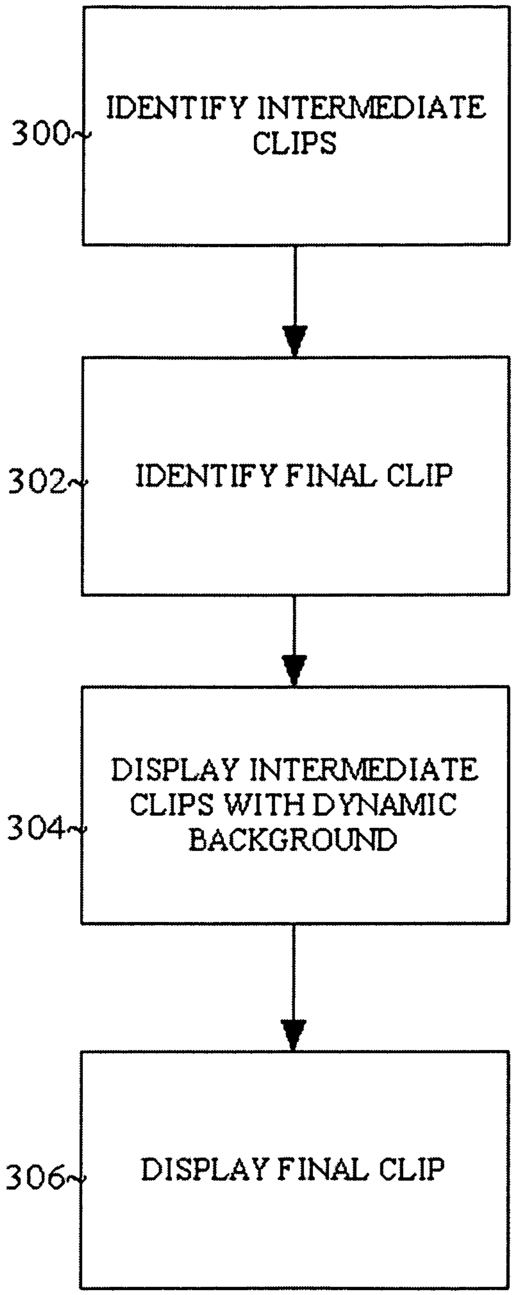
FIG. 3 is a flowchart illustrating an exemplary method of displaying an animation sequence, according to an embodiment.

FIG. 3 is a flowchart illustrating an exemplary method of displaying an animation sequence, according to an embodiment.

The method can start with operation 300, which identifies intermediate clips. An intermediate clip is a clip which may or may not include a beginning clip but typically does not show the final outcome. Intermediate clips are stored in storage such as illustrated in FIG. 2. These clips can be pre-generated and so the ones to be used should be identified.

From operation 300, the method proceeds to operation 302, which identifies the final clip. The final clip shows the final outcome (determined in operation 102). The final clip is also stored in a computer readable storage (typically the same one where the intermediate clips are stored, although this is not required).

From operation 302, the method proceeds to operation 304, which displays the identified intermediate clips in sequence. They are typically displayed seamlessly so that the viewer would not be aware that these are separate clips.

The intermediate clips can be displayed with a background. The background is not part of the intermediate clips themselves but can be superimposed on them. The background can comprise, for example, a stadium, golf course, etc. Thus, if the clip being displays is of a runner running, a stadium in the background can be displayed (and the stadium can move to give the illusion that the runner is changing his location in the stadium as he runs).

From operation 302, the method proceeds to operation 304, which displays the final clip seamlessly after the intermediate clips displayed in operation 304. The first frame of the final clip is typically frame matched with the last frame of the last intermediate clip played in operation 304 to give the viewer the effect of fluid motion.

Figure 4:
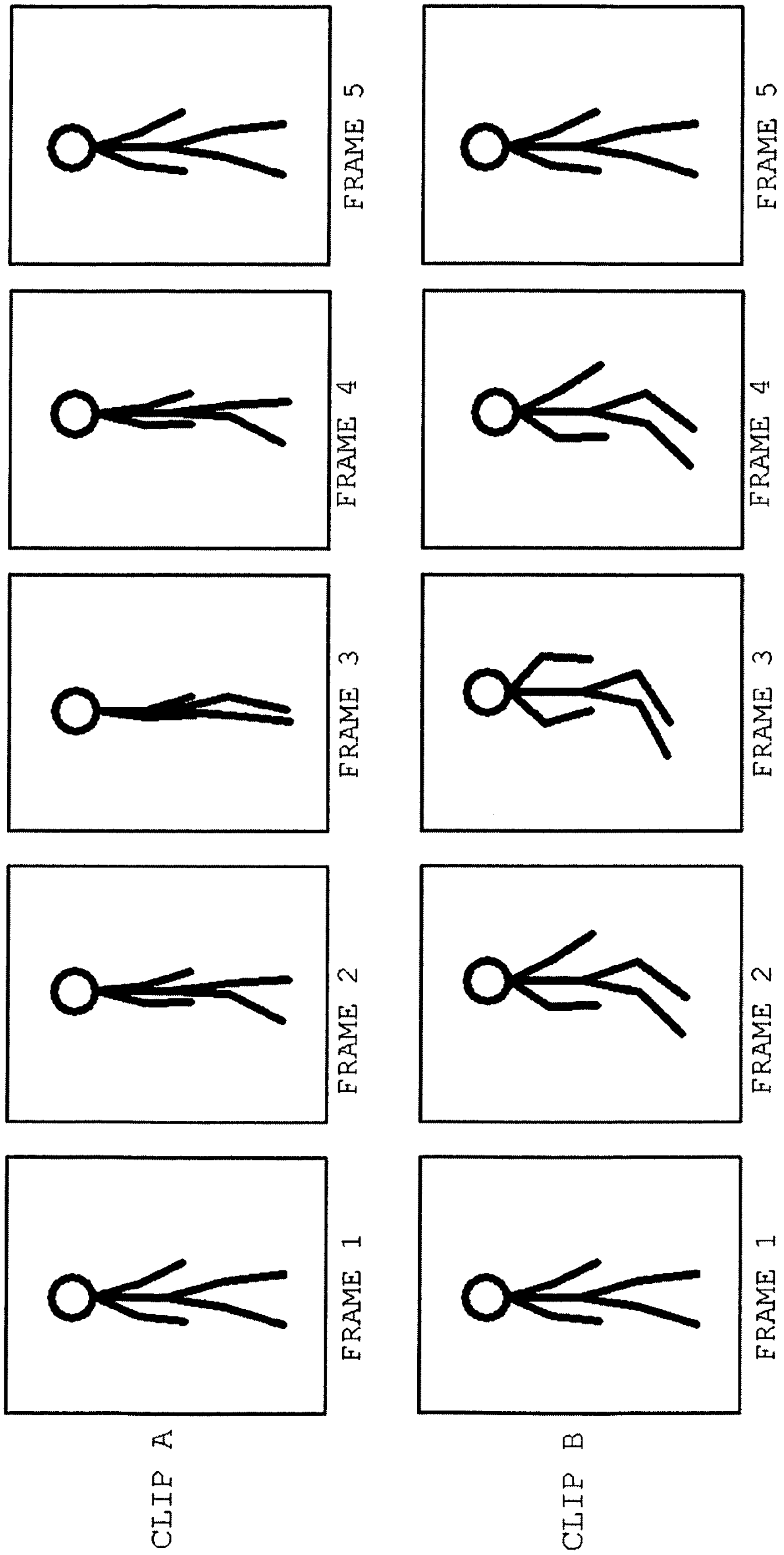
FIG. 4 is a drawing illustrating two movie clips frame matched at their beginning and ends, according to an embodiment.

FIG. 4 is a drawing illustrating two movie clips frame matched at their beginning and ends, according to an embodiment.

Clip A is a sequence of five frames showing a stick figure walking. Note that the first frame of clip A, frame 1, and the last frame of clip A, frame 5, are identical. Clip B is a sequence of five frames showing a stick figure jumping. Note that the first frame of clip B, frame 1, and the last frame of clip B, frame 5, are identical. Also note that the last frame of clip A is identical to the first frame of clip B, and that the last frame of clip B is identical to the first frame of clip A. This means that clip A and then clip B (or clip B and then clip A) can be displayed sequentially without any loss in continuity, because the frames are identical when the clips collide (the point where one starts and the other stops). Also, in a sequence of numerous clips, clip A and clip B can be interchanged without any loss in continuity. For example, consider of sequence of clips: X, A, D. This sequence can also be replaced with X, B, D, with no loss in continuity.

The characters in each frame should typically be positioned in the center of each frame so that any transformations of the character or object always originate from the vertical and horizontal center of the frame. This also avoids continuity errors when playing different clips sequentially. The characters in each clip should also be of the same scale. Each clip can also be created with a front view, side view, three quarters front view, and three quarters back view. These views can further be rotated (e.g., minor image) in order to create additional views.

When a frame is said to match another frame it typically should be an identical match. However, minor changes in frames that are not visible to the naked eye when the clip is playing at normal speed can also be considered a match as well.

Figure 5:
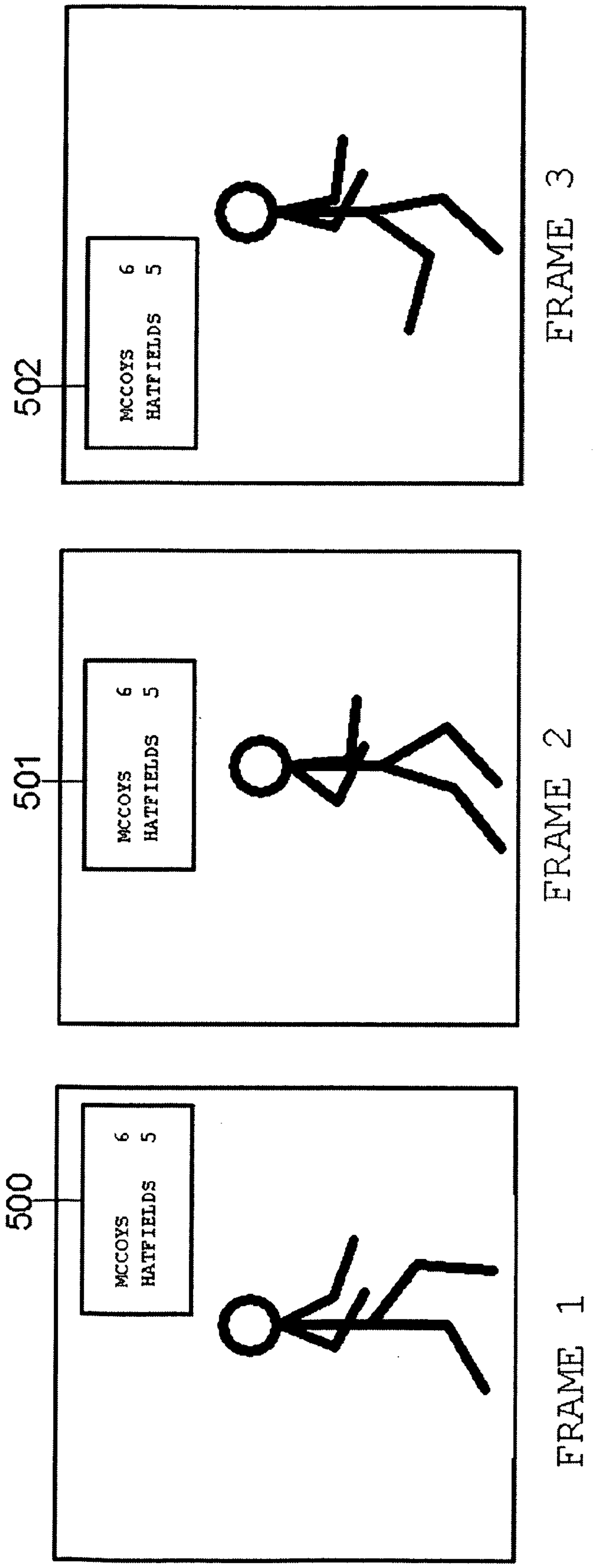
FIG. 5 is a drawing illustrating a movie clip with a moving background, according to an embodiment.

FIG. 5 is a drawing illustrating a movie clip with a moving background, according to an embodiment.

Frame 1 shows a stick figure running. The stick figure, can for example, be a soccer player running after a soccer ball. A background structure such as a scoreboard 500 is also shown. In frame 2, the stick figure moves in a running motion and the scoreboard 501 has moved to left, indicating that the stick figure is running to the right. In frame 3, the scoreboard 502 has moved even more to the left while the stick figure has moved in a running motion, giving the illusion that the stick figure continues to run to the right. Of course, this simple example only comprises three frames and is of a simple stick figure and scoreboard, but more complex characters and background structures can be used. For example, live motion captured humans can be used as the characters, or computer generated three-dimensional characters can be used. Backgrounds can comprise complex three dimensional structures such as stadiums, scoreboards, golf courses, racing tracks, playing fields, etc.

Thus, FIG. 5 illustrates the concept of a character moving in place while the background moves, giving the effect that the character is moving. Since the character (the stick figure in this example) remains in the same position, different clips can be combined sequentially without any loss in continuity.

A game result can be determined randomly, and then from that result, a number of animation clips can be presented to the player. For example, the player can make a wager to play a virtual game of golf, wherein an animated character (golfer) swings a club, and hits a ball. Depending on where the ball lands.

Figure 6:
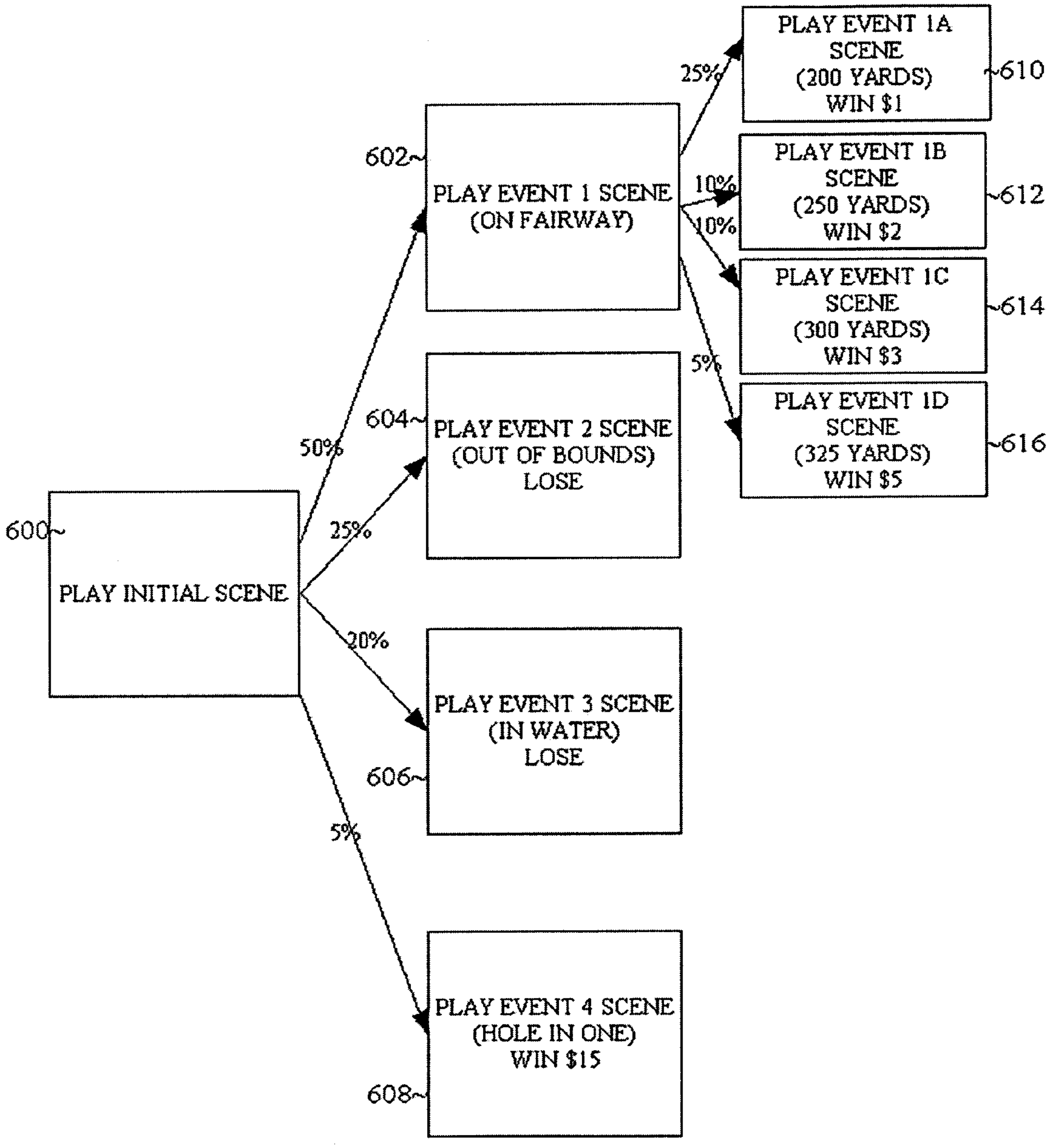
FIG. 6 is a block diagram illustrating a decision tree of different scenes and outcomes, according to an embodiment.

FIG. 6 is a block diagram illustrating a decision tree of different scenes and outcomes, according to an embodiment.

The presentation can begin with block 600, which plays an initial scene. In this example, the initial scene is a golfer swinging his club at a ball. The initial scene can be used for all of the outcomes.

Then, depending on probability, a further outcome is chosen. For example with a 50% probability, block 602 can be implemented which plays an event 1 scene, which is the ball being hit onto a fairway. The event 1 scene can be displayed using any methods known in the art or described herein. With a 25% probability, block 604 can be implemented which plays an event 2 (out of bounds) animation, wherein the player loses his wager. With a 20% probability, block 606 can be implemented which plays an event 3 scene (ball in water), wherein the player loses his wager. With a 5% probability, block 608 can be implemented which plays an event 4 scene (a hole in one), wherein the player wins $15. These probabilities and payouts are merely examples and one skilled in the art would appreciate that other probabilities could be used.

From block 602, there are further sub-outcomes that can result. The ball is hit on the fairway, but the ball could have travelled at varying lengths. Each length may have its own award. For example, once at block 602, with a 50% probability block 610 would be reached (or a 25% probability overall which is shown), which plays an event lA scene which shows the ball landing at 200 yards. The player would win $1. With a 10% overall probability, block 612 would be reached which plays an event 1B scene which shows the ball landing at 250 yards, wherein the player wins $2. With a 10% overall probability, block 614 would be reached which shows the ball landing at 300 yards, wherein the player would win $3. With a 5% overall probability, block 616 would be reached, which shows the ball landing at 325 yards, wherein the player would win $5.

Once the ball has landed, the player can begin a new game by placing a wager. The player can also place particular wagers on individual outcomes as well which pay a payout based on their overall probability of occurring.

Figure 7:
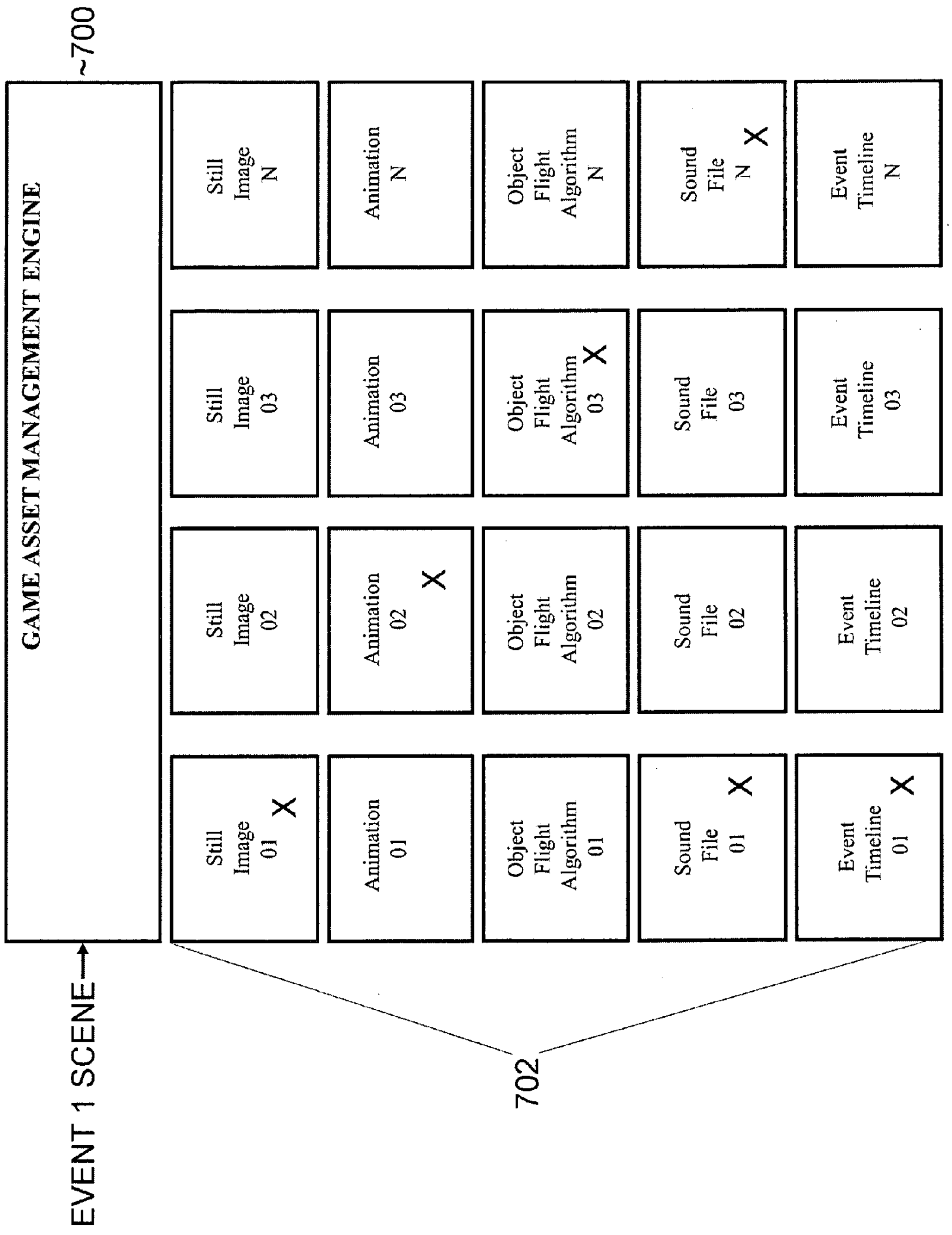
FIG. 7 is a block diagram illustrating different game assets that can be chosen by a game asset management engine, according to an embodiment.

FIG. 7 is a block diagram illustrating different game assets that can be chosen by a game asset management engine, according to an embodiment.

A game asset management engine 700 runs on a processing unit and has access to scene assets 702. The game asset manage engine 700 can run on a platform such as FLASH, available from ADOBE. Of course any other platform can be used as well. The scene assets 702 can be stored in any kind of electronic storage medium, such as a ROM, RAM, CD-ROM, DVD, hard disk, flash memory, etc.

Particular assets needed for the particular scene can be retrieved, for example those marked with an 'X' in FIG. 7 would be needed for the particular scene requested. The required assets needed for a particular scene can be determined by using a lookup table or other data structure which associates needed assets for a particular scene.

Game assets can also include dynamic assets such as flight algorithms. For example, a golf ball can be superimposed over a golf course animation and the movement of the ball can be determined and displayed using a flight algorithm. For example, characteristics of flight such as the balls mass, power, and trajectory can be stored with a game asset (such as an object flight algorithm), and when that asset is used it a game asset management engine (to be described below) can superimpose the golf ball (using an image of the golf ball stored with other assets) and displays its flight and landing.

Another asset that can be used to generate a scene is an event timeline. Different timelines can be stored for different scenes. All assets to be used for a scene can be placed into a respective timeline. The location that each needed asset is to be inserted into the respective timeline can also be stored.

In the example illustrated in FIG. 7, assets including image01, animation02, object flight algorithm03, sound file01, and sound fileN are used and are placed in event timeline 01 (at points in the timeline which can also be stored). In this way, a scene can be generated from these assets.

Figure 8:
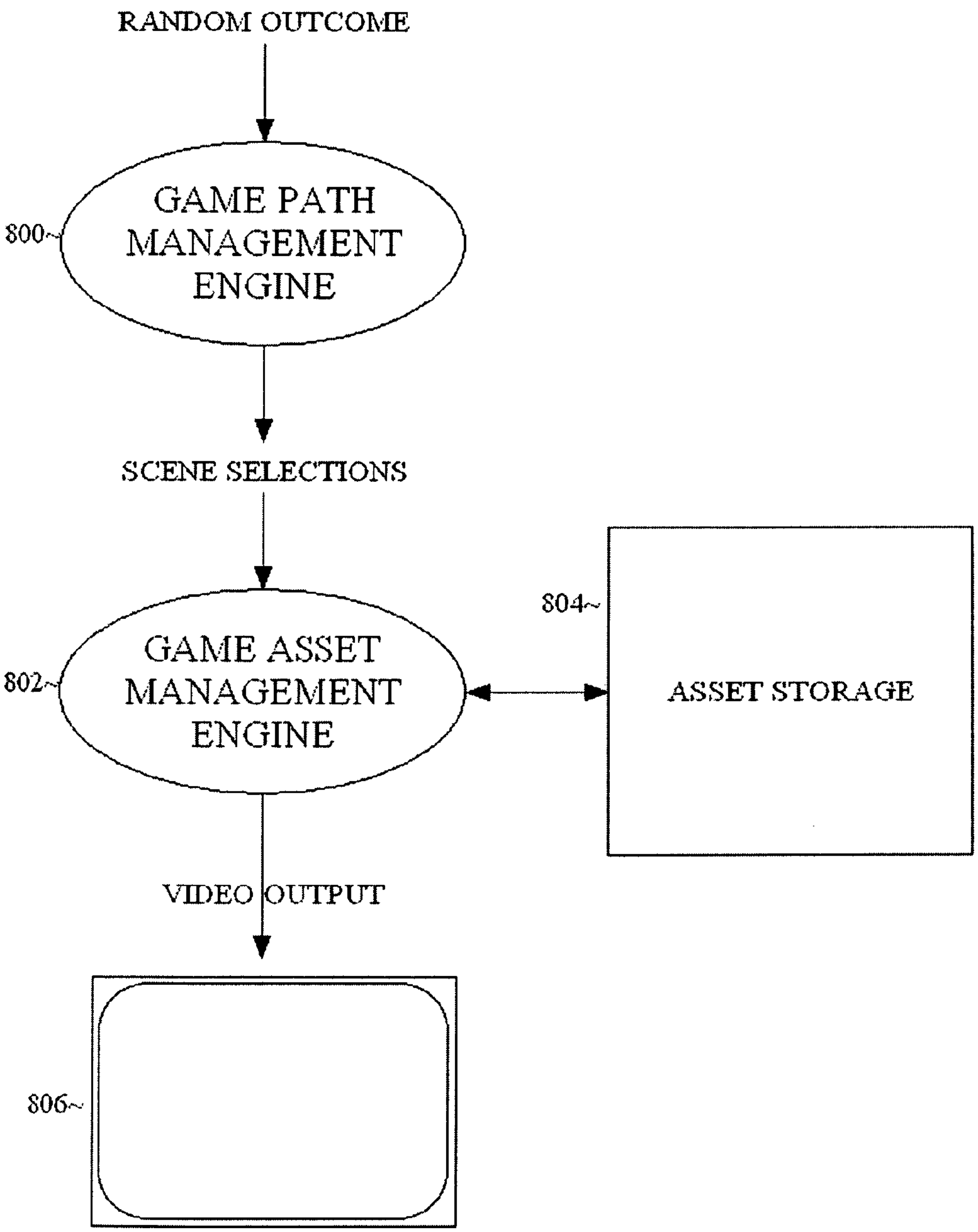
FIG. 8 is a flow diagram illustrating data flows to different aspects of the system, according to an embodiment.

FIG. 8 is a flow diagram illustrating data flows to different aspects of the system, according to an embodiment. FIG. 8 shows a high level overview of the system described herein.

A random outcome is determined by a computer program which represents a game outcome (e.g., hole in one, shot on the fairway, a goal, etc.) The random outcome can be weighted, that is, certain outcomes may have a greater probability of happening than other outcomes.

Once the random outcome is known, then an entire animation sequence (a collection of clips or scenes) can be presented to the player. It is noted that the same random outcome would have different animation sequences displayed. For example, if the random outcome is that a basketball player will dribble the basketball down the court, shoot, and score, this same outcome can be presented to the player in numerous different animations. For example, the basketball player (character) can run down to the right side of the court, shoot the basketball which rebounds off the backboard, and goes through the net. Or the basketball player (character) can run down the left side of the court and dunk the basketball into the net. The ultimate outcomes are the same, but the animation sequences presented to the player are different. This is advantageous in that the players do not become bored viewing the same animations over and over again.

The game path management engine 800 receives the random outcome and determines the scene selections. This can be done, for example, using a data structure such as that illustrated in FIG. 6. This can also be done by using a table, such as that illustrated in Table II, which identifies particular outcomes, and different possible sequences of combinations of clips to display that outcome.

TABLE II

| Outcome | sequence | clips |
|---|---|---|
| #1 | 1 | A, D, F |
| #1 | 2 | A, J, F |
| #1 | 3 | B, D, F |
| #1 | 4 | C, D, F |
| #2 | 1 | A, O, P |
| #2 | 2 | A, D, P |

For example, outcome #1 can be a particular outcome, such as a soccer player scoring a goal. There are four listed potential ways to achieve this outcome. Clip A shows a player initially running towards the ball, and clip F shows the final outcome of the score being made). For example, in sequence 1, clips A, D, F and be played sequentially. In sequence 2, clips A, J, and F can be played sequentially. The end result of both sequences is still the same (the score being made), but clips D and J can show different actions (the player kicking the soccer ball using different moves). The particular sequence used for the predetermined outcome can be chosen randomly.

Note that an initial clip (e.g, clip A) does not have to have its first frame matched with other clips but its last frame should match the other clips' (but for final clips) first and last frames. Similarly, a final clip does not have to have its last frame matched with other clips but should have its first frame matched with other clips' (but for initial clips) first and last frames. An initial clip is a first clip, for example, which shows a golfer taking a swing and hitting a ball. All of the predetermined outcomes may start with the same initial clip, although this is not required. A final clip shows the predetermined outcome happening, such as a golf ball going into the hole. Since this is the final clip in the sequence, the last frame does not have to match other clips' frames.

In this manner, a reduced amount of game assets are required because clips can be combined with each other without continuity issues. As described herein, clips can have certain characteristics, such as having starting and ending frames matching, so they can be mixed, interchanged, and combined, without continuity errors. Thus, intermediate clips (clips which aren't the first clip or the last clip) can be used interchangeably, that is, they can be substituted for one another without any affect on the final outcome of the presentation, the game, or continuity of the video presentation. With regard to Table II above, clips D and J are interchangeable clips from sequence 1 and 2. Interchangeable clips which are played can be selected at random, can be chosen from a table, or can be alternated between (e.g., first clip X is used, the next time clip Y is used, the next time clip X is used, etc.)

Once the scene selections (clips) are determined from the game path management engine 800, then they can be passed to a game asset management engine 802. The game path management engine 802 retrieves needed assets for the scene selections, combines and processes the assets in order to output a final animation on an output device 806 associated with the gaming machine the game is being played on. The game path management engine 802 also can control the position, scale, transparency, and rotation (e.g., mirror image) of characters in each clip.

Figure 9:
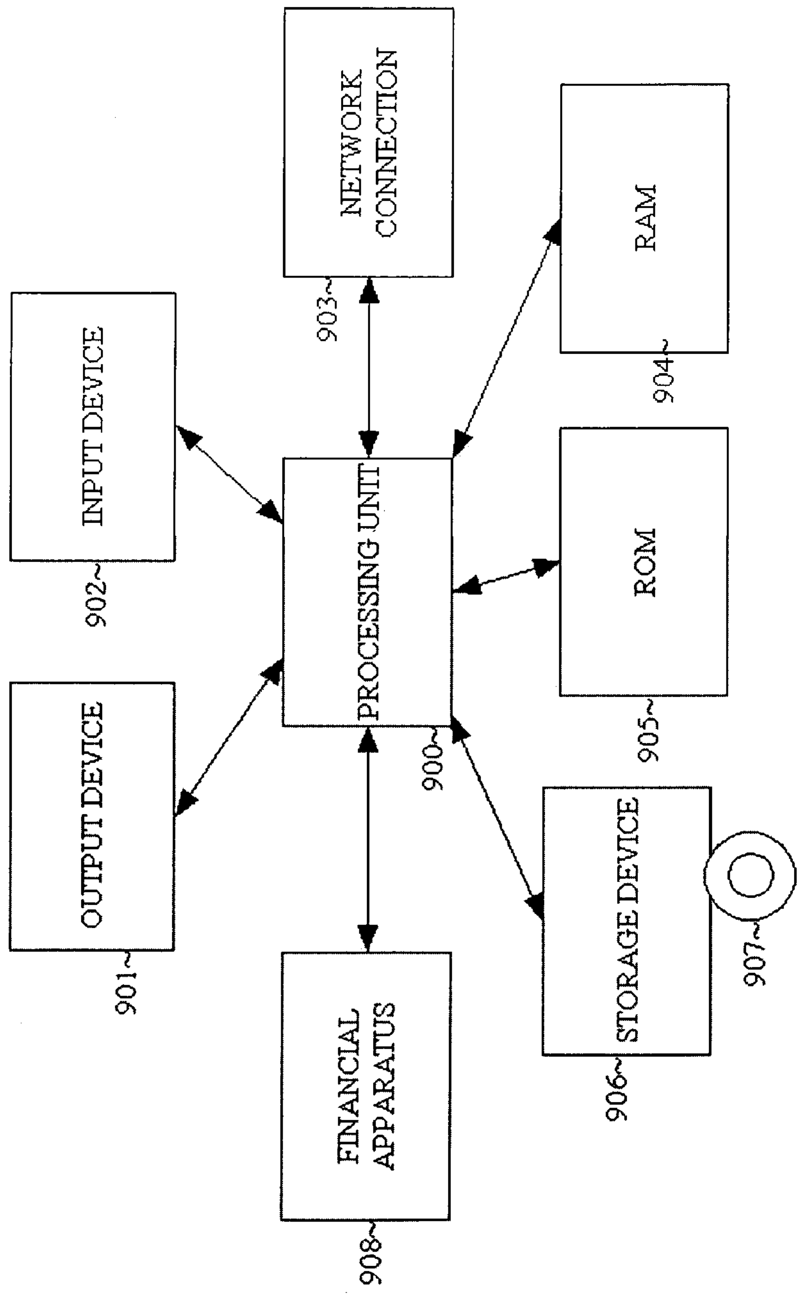
FIG. 9 is a block diagram illustrating exemplary hardware that can be used to implement a gaming machine which can perform the methods described herein, according to an embodiment.

FIG. 9 is a block diagram illustrating exemplary hardware that can be used to implement a gaming machine which can perform the methods described herein, according to an embodiment.

A processing unit 900 (such as a microprocessor and any associated components) is connected to an output device 901 (such as an LCD monitor, touch screen, CRT, etc.) and an input device 902 (e.g., buttons, a touch screen, a keyboard, mouse, etc.) The processing unit 900 can also be connected to a network connection 903, which can connect the electronic gaming device to a computer communications network such as the Internet, a LAN, WAN, etc. The processing unit 900 is also connected to a RAM 904 and a ROM 905. The processing unit 900 is also connected to a storage device 906 which can be a DVD-drive, CD-ROM, flash memory, etc. A computer readable storage medium 907 can store a program which can control the electronic device to perform any of the methods described herein. The processing unit 900 can also be connected to a financial apparatus 908 which can receive cash and convert the received cash into playable credits for use by the player when playing the electronic device. When the player decides to cash out any remaining credits, the financial apparatus 908 can issue coins or a cashless ticket (voucher) for the remaining credits which is redeemable by the player.

The descriptions provided herein also include any hardware and/or software known in the art and needed to implement the operations described herein. Further, all methods described herein can be programmed on a digital computer and stored on any type of computer readable storage medium, especially when directed toward an electronically-enhanced physical gaming table, or an online/internet implementation of the game.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to play a wagering game, the method comprising:

providing a processing unit and an output unit;

executing instructions on the processing unit to perform a following operations:

storing clips of a character animation in a storage medium;

for each different possible outcome, providing a set of potential clip sequences, each potential clip sequence comprising an initial clip, at least two intermediate clips, and a final clip;

receiving a wager from a player;

identifying a final outcome determined by an electronic random number generator;

determining a displayed clip sequence randomly out of the set of potential clip sequences that is associated with the final outcome, with a final clip in the displayed clip sequence displaying the final outcome, clips in the displayed sequence being retrieved from the storage medium;

displaying the displayed clip sequence, wherein a first frame and last frame of intermediate clips in each potential clip sequences are identical match to a first frame of the final clip in the potential clip sequences but not last frame of the final clip in the potential clip sequences; and awarding an award to the player, if earned, based on the final outcome.

2. The method as recited in claim 1, wherein the intermediate clips are displayed over a moving background, the moving background being generated based on a virtual location of a character.

3. The method as recited in claim 1, wherein each intermediate clip is a front view with a counterpart back view intermediate clip.

4. The method as recited in claim 1, wherein the displaying also comprises superimposing a moving game piece.

5. An apparatus to play a wagering game, the apparatus comprising:

an output unit;

a storage unit storing clips of a character animation;

a processing unit configured to perform a following operations:

for each different possible outcome, providing a set of potential clip sequences, each potential clip sequence comprising an initial clip, at least two intermediate clips, and a final clip;

receiving a wager from a player;

identifying a final outcome determined by an electronic random number generator;

determining a displayed clip sequence randomly out of the set of potential clip sequences that is associated with the final outcome, with a final clip in the displayed clip sequence displaying the final outcome, clips in the displayed sequence being retrieved from the storage unit; and displaying the displayed clip sequence;

wherein a first frame and last frame of intermediate clips in each potential clip sequences are identical match to a first frame of the final clip in the potential clip sequences but not last frame of the final clip in the potential clip sequences; and awarding an award to the player, if earned, based on the final outcome.

6. The method as recited in claim 5, wherein the intermediate clips are displayed over a moving background, the moving background being generated based on a virtual location of a character.

7. The method as recited in claim 5, wherein each intermediate clip is a front view with a counterpart back view intermediate clip.

8. The method as recited in claim 5, wherein the displaying also comprises superimposing a moving game piece.

* * * * *